(12) United States Patent
Kishiyama et al.

(10) Patent No.: US 8,536,825 B2
(45) Date of Patent: Sep. 17, 2013

(54) STATE OF CHARGE RANGE

(75) Inventors: Clay Hajime Kishiyama, San Francisco, CA (US); Vineet Haresh Mehta, Mountain View, CA (US); Christopher David Gadda, Sunnyvale, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 725 days.

(21) Appl. No.: 12/651,426

(22) Filed: Dec. 31, 2009

(65) Prior Publication Data

US 2011/0156641 A1  Jun. 30, 2011

(51) Int. Cl.
*H02J 7/00* (2006.01)
*H02J 7/14* (2006.01)

(52) U.S. Cl.
USPC ............. 320/104; 702/63; 180/65.29

(58) Field of Classification Search
USPC ............. 320/104; 702/63; 180/65.29
See application file for complete search history.

(56) References Cited

U.S. PATENT DOCUMENTS

| | | | | |
|---|---|---|---|---|
| 2001/0024104 | A1* | 9/2001 | Suzuki | 320/104 |
| 2005/0261844 | A1* | 11/2005 | Iwers | 702/63 |
| 2006/0278449 | A1* | 12/2006 | Torre-Bueno | 180/65.2 |

FOREIGN PATENT DOCUMENTS

JP  2004291681  * 10/2004

OTHER PUBLICATIONS

U.S. Appl. No. 12/322,217, filed Jul. 10, 2010.

* cited by examiner

*Primary Examiner* — Samuel Berhanu
(74) *Attorney, Agent, or Firm* — J. Richard Soderberg

(57) ABSTRACT

A system and method for improving cycle lifetimes for a lithium-ion battery pack, particularly for adapting to a dynamic use profile for a user. A battery cell pack charging system, including a charger and a controller, for charging a lithium-ion battery cell pack, the battery cell pack charging system has a circuit for charging the battery cell pack using an adjustable charging system including an adjustable charge profile to charge the battery cell pack wherein the adjustable charge profile includes: an operational parameter identifying a next operation post-charge performance characteristic for the battery cell pack wherein a controller determines a next cycle plan for the battery cell pack that provides the performance characteristic while concurrently enhancing an attribute of the battery cell pack and wherein the attribute is measured over a plurality of applied cycles; and one or more charging stages to produce an energy ending point for the plan; wherein the adjustable charge plan is implemented by the charger in anticipation of a post-charging operation associated with the operational parameter.

5 Claims, 2 Drawing Sheets

STATE OF CHARGE RANGE

BACKGROUND OF THE INVENTION

The present invention relates generally to rechargeable lithium-ion-type chemistry batteries, and more specifically to improving battery pack life of automotive Li-ion battery packs.

Lithium ion batteries are common in consumer electronics. They are one of the most popular types of battery for portable electronics, with one of the best energy-to-weight ratios, no memory effect, and a slow loss of charge when not in use. In addition to uses for consumer electronics, lithium-ion batteries are growing in popularity for automotive, defense, and aerospace applications due to their high energy and power density.

One of the advantages of use of a Li-ion chemistry is that batteries made using this technology are rechargeable. Traditional charging is done with a two-step charge algorithm: (i) constant current (CC), and (ii) constant voltage (CV). In electric vehicles (EVs), the first step could be constant power (CP).

Step 1: Apply charging current limit until the volt limit per cell is reached.

Step 2: Apply maximum volt per cell limit until the current declines below a predetermined level (often C/20 but sometimes C/5 or C/10 or other value).

The charge time is approximately 1-5 hours depending upon application. Generally cell phone type of batteries can be charged at 1C, laptop types 0.8 C. The charging typically is halted when the current goes below C/10. Some fast chargers stop before step 2 starts and claim the battery is ready at about a 70% charge. (As used herein, "C" is a rated current that discharges the battery in one hour.)

Generally for consumer electronics, lithium-ion is charged with approximate 4.2±0.05 V/cell. Heavy automotive, industrial, and military application may use lower voltages to extend battery life. Many protection circuits cut off when either >4.3 V or 90° C. is reached.

In battery-powered systems, the ability to accurately estimate the charge remaining in the battery is highly desirable, and in many cases essential. For example, in portable electronic devices such as cameras, cell phones, portable gaming systems and computers, knowing such information allows the end user to gauge how much longer they can use the device before recharging becomes necessary. In some cases, this information can prevent the end user from inadvertently losing data, a common occurrence when a camera or a computer suddenly stops functioning due to the battery becoming fully discharged. In other applications, such as electric vehicles, knowing the remaining battery capacity may make the difference between a successful trip and an unsuccessful trip, i.e., one in which the vehicle and its driver become stranded when, without providing sufficient warning, the battery becomes fully discharged. Additionally, since a battery's voltage drops as the state of charge of the battery is reduced, knowing the state of charge allows an accurate estimate to be made of the power available to the battery-operated device, e.g., an electric vehicle.

In order to accurately estimate the remaining capacity of a battery, it is critical that the full capacity of the battery be accurately known. Unfortunately, under normal use conditions such as those encountered in an electric vehicle or other battery-power device, it is difficult to accurately ascertain battery capacity. For example, in one method of determining battery capacity, the initial capacity of the battery is gradually decreased based on a variety of factors such as battery age, the number of charge/discharge cycles to date, and temperature. Unfortunately this technique does not provide a very accurate assessment of battery capacity, both because some factors are not properly taken into account (e.g., historical temperature profiles, load conditions, depth of discharge prior to each charging, charge/discharge rates, etc.) and because the effects of the errors accumulate as the battery ages. Another method of determining battery capacity is to allow the battery to become fully discharged, and then determine the capacity of the battery during charging. Although this technique can be used occasionally, using it on a routine basis can have serious repercussions since deep discharging a battery, and in particular fully discharging a battery, can dramatically shorten its lifetime. Additionally, for most battery-powered devices, especially electric vehicles, it would be extremely inconvenient to require that the user allow the battery to become fully discharged prior to charging. This would be similar to requiring that a conventional car be driven until the gas tank was dry before refilling, simply in order to determine the gas tank's capacity.

It is important to emphasize that the prior art recognizes concerns for various charging systems, particularly as to safety and degradation of a battery cell. As battery packs used for heavy use, such as automotive electric vehicles and other heavy industrial application often have thousands of battery cells, and the assembly of the cells represents a large investment of resources (money and time), issues regarding safety and degradation are even more important. In contrast, many consumer devices include a rechargeable battery cell that typically represents a relatively small fraction of total cost, and there is generally no special requirements for obtaining and replacing a battery cell, and battery cycle life is relatively less important than capacity.

For consumer applications, aging of lithium-ion battery cells is often not a factor. A lithium-ion battery in use typically lasts between 5-7 years as it loses capacity. This capacity loss manifests itself in increased internal resistance caused by mechanical stresses (e.g., volume change, side reactions and the like) and oxidation. Eventually, the cell resistance reaches a point where the pack is unable to deliver the stored energy although the battery may still have ample charge. For this reason, an aged battery can be kept longer in applications that draw low current as opposed to a function that demands heavy loads. Increasing internal resistance with cycle life and age is typical for cobalt-based lithium-ion, a system that is used for cell phones, cameras and laptops because of high energy density. The lower energy dense manganese-based lithium-ion, also known as spinel, maintains the internal resistance through its life but loses capacity due to chemical decompositions. Spinel is primarily used for power tools.

While the general statement about limited service life of lithium-ion batteries is accurate, it is understood that longevity is very much a factor of "life style" and "living conditions" experienced by the battery pack and its cells. The speed by which lithium-ion ages is governed by many factors including temperature and state-of-charge. High charge levels and elevated temperatures hasten permanent capacity loss. Improvements in chemistry have increased the storage performance of lithium-ion batteries. The voltage level to which cells are charged also plays an important role in longevity—with a value of 4.1 maximum cell voltage chosen as good trade-off between sufficient cell capacity and reduced cycle life degradation.

Generally speaking, batteries have an increased cycle life when treated in a gentle manner. High charge voltages, excessive charge rate and extreme load conditions will have a negative effect and shorten the battery life. This also applies to high current rate lithium-ion batteries. Not only is it better to charge lithium-ion battery at a slower charge rate, high discharge rates also contribute the extra wear and tear. When a battery is charged and discharged at less than 1C, cycle lifetime for high energy density cells is generally much better than higher charging/discharge levels (as measured by a discharge capacity of the battery (Ah). (Using a 0.5C charge and discharge rate would further improve this rating. Power cells are able to handle higher rate charges and discharges.) A moderate charge and discharge puts less stress on the battery, resulting in a longer cycle life. In addition, the temperature and state of charge that the battery is stored is critical to its longevity. Keeping the battery at high SOC and high temperatures should be avoided. For example, when preparing for a long period of non-use, the vehicle should be stored at a lower SOC. Although the vehicle range is reduced in a storage mode, this sacrifice in range is beneficial to extend the pack life.

The life of lithium-ion depends on other factors than charge and discharge rates. Even though incremental improvements may be achieved with careful use of the battery, the battery cell environment and the services required are not always conducive to achieve optimal battery life. The longevity of a battery is often a direct result of the environmental stresses applied.

The very considerations given above for increasing battery cycle life can often conflict with some of the requirements for long vehicle range and use of high performance battery packs used in automotive applications and other industrial scenarios. As noted above, the resource costs represented by an advanced battery pack for automotive and industrial applications are significant, and reaching close to optimal balance between long range and pack cycle life is very important. The challenges are increased because each user will have different requirements, and those requirements will vary over time. In short, there is typically not a single solution that can be established a priori for each user.

There is a need to improve cycle lifetimes for an automotive lithium-ion battery pack, particularly for adapting to a dynamic use profile for a user. A careful balance between the range required by the individual user and long term life of the battery pack needs to be created. The following invention addresses this issue and provides a novel and non-obvious solution.

BRIEF SUMMARY OF THE INVENTION

Disclosed is a system and method for improving cycle lifetimes for a lithium-ion battery pack, particularly for adapting to a dynamic use profile for a user. A management system for a battery cell pack, the management system has a controller determining an adjustable charge profile for the battery cell pack wherein the adjustable charge profile includes: an operational parameter identifying a next operation post-charge performance characteristic for the battery cell pack wherein a controller determines a next cycle plan for the battery cell pack that provides the performance characteristic while concurrently enhancing an attribute of the battery cell pack and wherein the attribute is measured over a plurality of applied cycles; and one or more charging stages to produce an energy ending point for the plan.

One implementation of the present invention includes a battery cell pack charging system, including a charger and a controller, for charging a lithium-ion battery cell pack, the battery cell pack charging system includes a circuit for charging the battery cell pack using an adjustable voltage charge profile to apply a charging voltage and a charging current to the battery cell pack wherein the adjustable charge profile includes: an operational parameter identifying an associated next operation post-charge performance characteristic for the battery cell pack wherein the controller determines a next-charging cycle charge plan for the battery cell pack that provides the post-charge performance characteristic while concurrently enhancing an attribute of the battery cell pack wherein the attribute is measured over a plurality of applied discharging/charging plans; one or more discharging stages to produce an energy starting point for the plan; and one or more charging stages to produce an energy ending point for the plan; wherein the charge plan is implemented by the charger in anticipation of a post-charging operation associated with the operational parameter.

A battery cell pack charging method for charging a lithium-ion battery cell pack, the battery cell pack charging method includes the steps of: (a) identifying a next operation post-charge performance characteristic for the battery cell pack wherein a controller determines a next cycle plan for the battery cell pack that provides the performance characteristic while concurrently enhancing an attribute of the battery cell pack and wherein the attribute is measured over a plurality of applied cycles; (b) optionally discharging the battery cell pack to produce an energy starting point for the plan; (c) charging the battery cell pack to produce an energy ending point for the plan; and (d) implementing the plan by a charger coupled to the battery cell pack in anticipation of a next operation post-charge performance identified by the next operation post-charge performance characteristic. Discharging is identified as optional as discharging is preferably accomplished, in the case of an automotive battery cell pack, by operation of the vehicle in contrast to manually draining the battery cell pack. In some instances, the cycle plan may require a lower SOC than currently available (say for a period in which the vehicle will have reduced/zero operation) in which case it may be desirable to discharge the battery cell pack without operation.

Other advantages of the present invention will be seen by a review of the present disclosure.

DETAILED DESCRIPTION OF THE INVENTION

Embodiments of the present invention provide a system and method for a management system and a battery charger for improving cycle lifetimes for a battery cell pack, particularly for adapting to a dynamic use profile for a user of an electric vehicle. The following description is presented to enable one of ordinary skill in the art to make and use the invention and is provided in the context of a patent application and its requirements. In the following text, the terms "battery", "cell", "battery cell" and "battery cell pack" may be used interchangeably and may refer to any of a variety of different rechargeable cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
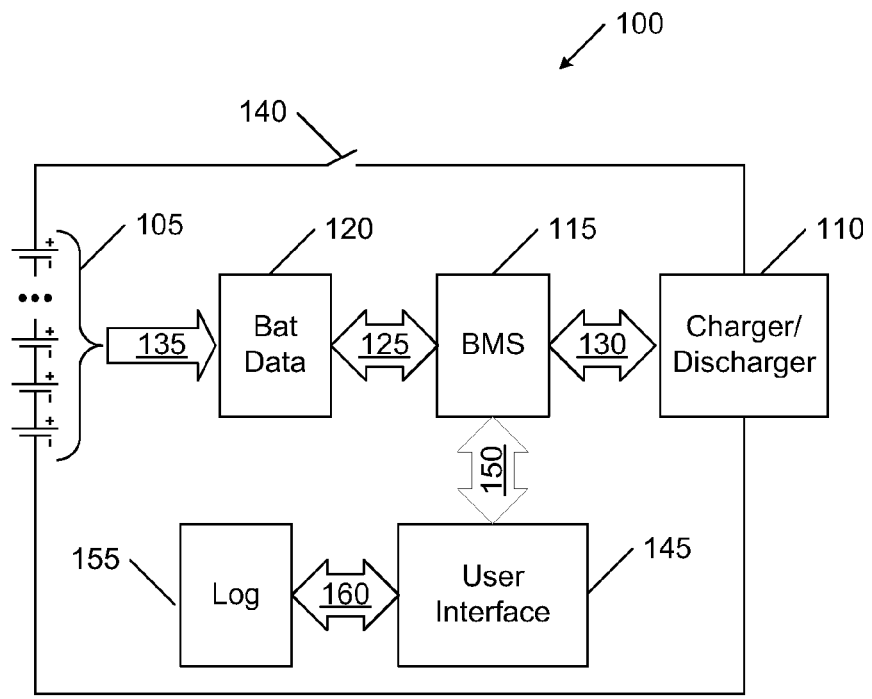
FIG. 1 is a representative charging system.

FIG. 1 is a preferred embodiment for a state-of-charge (SOC) control system 100, such as may be used in an electric vehicle implementing preferred embodiments of the present invention. System 100 includes a battery 105, a charger/discharger 110 coupled to battery 105 and a battery management system (BMS) 115 and a battery data acquisition and monitoring subsystem 120. A communication bus 125 couples subsystem 120 to BMS 115 and a communication bus 130 couples BMS 115 to charger/discharger 110. A communication bus 135 couples battery data from battery 105 to subsystem 120, and an optional switch 140 interposed in series between battery 105 and charger/discharger 110. A user interface subsystem 145 is coupled to BMS 115 by a bus 150 and to a log 155 by a bus 160.

Battery 105 is shown as a series-connected group of battery cells, however the arrangement of cells may be a combination of parallel/series connected cells of many different arrangements. Charger/discharger 110 of the preferred embodiment provides the charging current for battery 105, sourcing or sinking current as necessary. BMS 115 controls the charging current according to a profile established by the embodiments of the present invention. Subsystem 120 acquires the desired data as described herein regarding battery 105. For example, voltage, SOC, temperature, and other applicable data used by BMS 115. In some embodiments, subsystem 120 may be part of BMS 115 and BMS 115 may be part of charger 110. One or more of charger 110, BMS 115, and subsystem 120 control switch 140.

Log 155 provides a user, via interface 145, with operation/performance data (e.g., information from a vehicle management system such as range and vehicle efficiency) which preferably includes miles driven per day as well as other data and statistical performance information relevant to the user. The user operates interface 145 to set, specify, and/or program an operational profile for use by system 100. One or more components of system 100 include a processor and a memory for storing and processing computer program instructions operable on the processor for implementing embodiments of the present invention. The code may physically be part of BMS 115 or part of the vehicle management system integrated with, or provided in addition to, components of system 100.

Other implementations of the present invention may not be provided as part of a charging/discharging system but other provide an adjustable charge profile as described herein for use/reference by the user or other device, system, or process.

Figure 2:
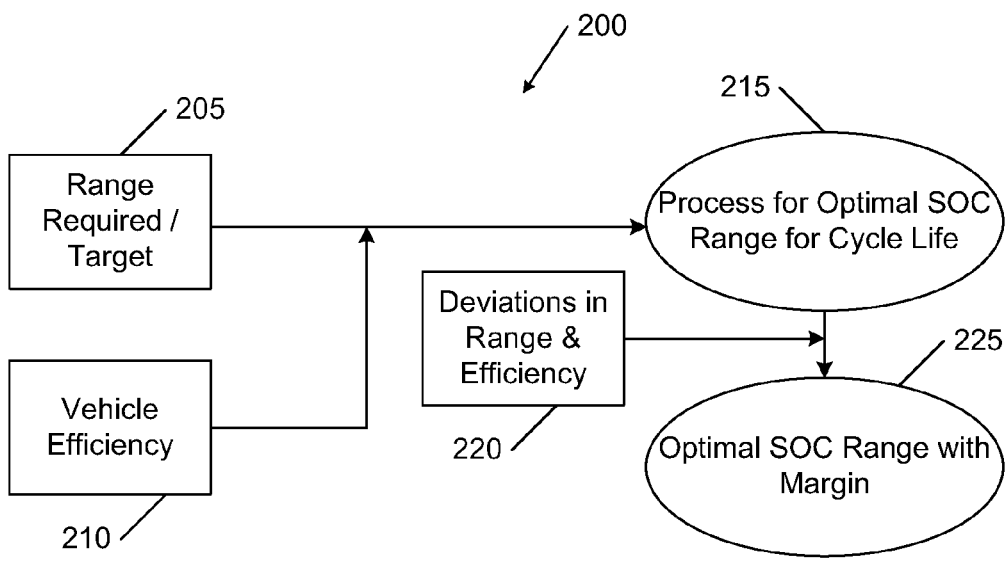
FIG. 2 is an exemplary process control diagram.

FIG. 2 is an exemplary process control diagram for a discharging/charging control 200 used in system 100 shown in FIG. 1. To simplify the discussion, control 200 is described for an embodiment when system 100 is provided as part of an electric vehicle having a rechargeable battery cell pack and an adjustable charging profile operates with respect to SOC for the pack. Control 200 includes accessing a range required target 205, such as for example from user input via user interface 145. In addition to target range from 205, control 200 determines or acquires information relating to vehicle efficiency 210. For an electric vehicle, in contrast to miles per gallon (MPG) which is one way to represent efficiency of a gasoline engine, vehicle efficiency is measured in terms of Watt-Hour Per Mile (Wh/mi). Control 200, at process 215, determines an optimal SOC range to achieve the vehicle range target, given the provided vehicle efficiency, while optimizing battery pack cycle life.

While the charging profile from process 215 works in a near best-case scenario, it is desirable to provide some operational margin on top of the profile determined based upon just the target range and some value for vehicle efficiency. There are deviations from range and efficiency that may be determined in many different ways, as well as some predetermined (e.g., factory or user preset value) range safety margin to ensure that the vehicle has extra capacity to reduce chances of prematurely running out of charge. Control 200 provides deviations for range and vehicle efficiency in process 220. Control 200 then, at process 225, modifies the optimized SOC-cycle-preserving profile from process 215 by re-optimizing the SOC-cycle preserving profile when considering the range and efficiency deviations from process 220.

In operation, consider the following exemplary scenario. A user operates an electric vehicle having a 200 mile range. The user plans on needing the vehicle for less than the maximum range, say a 100 mile range. The user may request control 200 to determine an SOC-cycle-preserving profile to provide a 100 mile range at some particular vehicle efficiency. This however risks stranding the user should actual range required be greater than the target range. To provide a margin, there are many different implementations. One preferred implementation is for control 200 to determine an average distance driven (e.g., over a month, a week, only relevant period—(weekday/weekend/holiday)) and a standard deviation for this average. The standard deviation may indicate up to a 5% possible variation in range. Control 200 would then use a modified target range of 105 miles instead of 100 miles. This now includes a margin for range deviation. The SOC for 105 miles is a particular amount of energy (watt-hours—Wh). But that determination assumes a certain vehicle efficiency of Wh/mi—in other words that the user will actually be able to travel 105 miles with the predetermined number of Watt-hours. Vehicle efficiency is not constant and varies based upon different factors and energy consumption from the battery. When the user is driving more aggressively, vehicle efficiency will be less than when the user is driving more conservatively, other factors being equal, and the user will require more energy to travel one mile. Control 200 determines an average vehicle efficiency over a relevant period, uses that as part of process 210 to determine the initial energy estimate from process 215, and determines a standard deviation of vehicle efficiency and uses the deviation as part of process 220 to adjust the modified energy estimate for the modified range of 105 miles from process 225.

Figure 3:
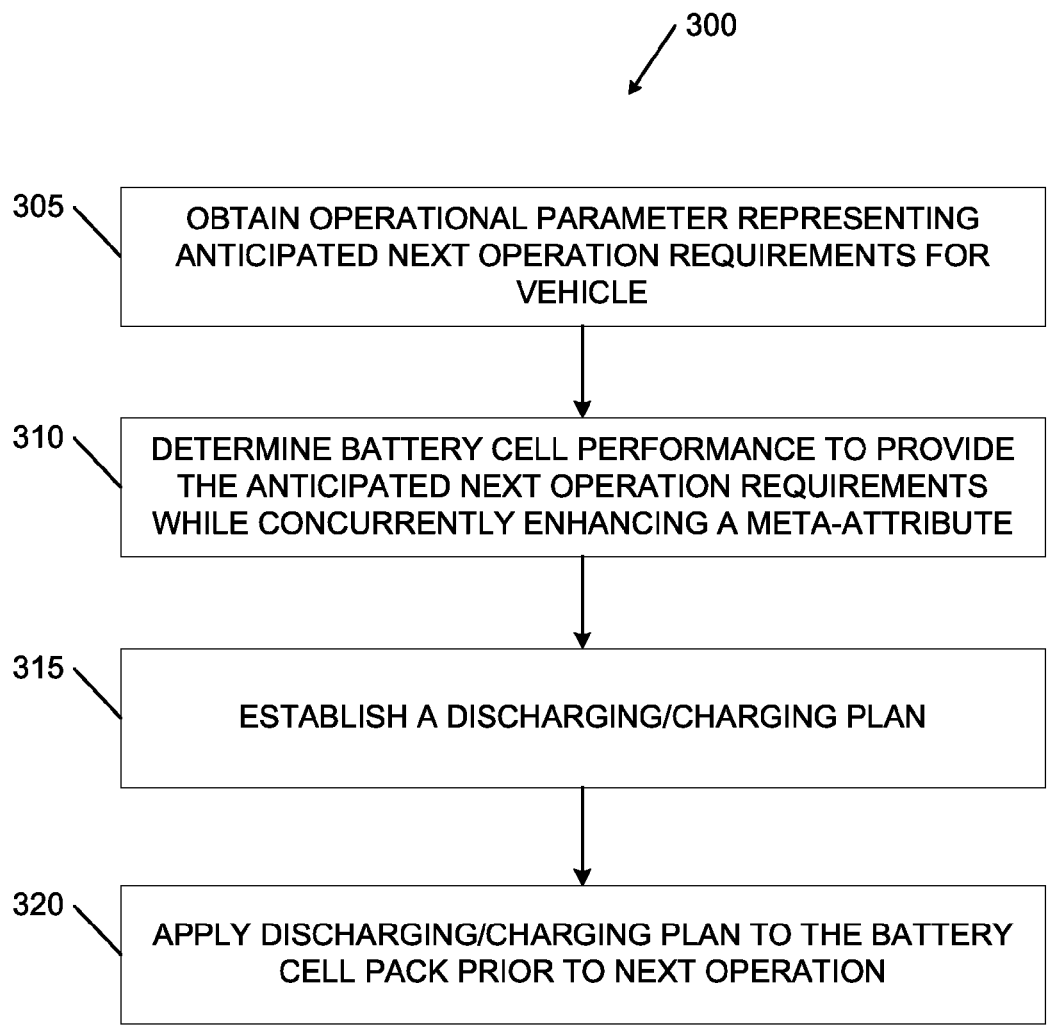
FIG. 3 is a flowchart for a charging system.

FIG. 3 is a flowchart for a discharging/charging process 300 used in system 100 shown in FIG. 1. Process 300, adapted for an automotive use, includes four steps: anticipated vehicle performance specification 305, battery cell pack performance specification 310, discharging/charging plan specification 315, and application of the discharging/charging plan 320.

Step 305 obtains an operational parameter representing an anticipated next operation requirements for the application (e.g., an electric vehicle range). This parameter may identify many different things depending upon application and use. To simplify the following discussion the representative application includes charging battery packs for electric vehicle use, though it is understood that the invention is not constrained in this way. For an electric vehicle, there may be different operational parameters that could be used, but the preferred embodiments of the present invention focus on vehicle range. Specifically, step 305 obtains a parameter representing an anticipated desired driving range, such as miles. This is an anticipatory parameter identifying a range at some future time, preferably the next operational cycle following the next charging cycle. The battery cell pack is periodically charged and the present embodiments control a charging cycle immediately before the next-operational use with the parameter relevant to that next-operational use.

This operational parameter may be obtained in several different ways. For example, the user may specify the range expressly (such as by a weekly schedule or a daily customized calendar). A weekly schedule could be something as simple as identifying a 60 mile range for Monday-Friday and a 110 mile range on Saturday and Sunday. A daily customized calendar could allow the user to set a mileage range for each day however desired. (Interface 145 provides one mechanism permitting the user to review and set this operational parameter.) In some cases, the operational parameter may be wholly or partially set automatically. For example, in one preferred embodiment, step 305 processes the vehicle log to determine likely operational parameters for future days based upon actual past performance. This may be appropriately refined in several ways, such as by using historical data to set tentative anticipatory values that have appropriate margins—the user may accept or modify the values as desired.

Step 310, next following step 305, determines a battery cell performance to provide the anticipated next operation requirements WHILE concurrently enhancing a meta-attribute of the battery cell pack. In the present context, the preferred embodiments use SOC as the battery cell performance parameter and battery cycle life as the meta-attribute. In other words, step 310 determines a specific SOC that satisfies the desired range parameter while improving the cycle lifetime. There could be many different SOC profiles that satisfy the desired range parameter but likely one SOC profile that satisfies the desired range parameter and reduces the impact of any high SOC/voltage charging on the life cycle. An important point is that the system dynamically responds to the range and battery characteristics to optimize the SOC based upon the life cycle which for different SOC may result in different SOC starting points and SOC ending points.

Step 315, following step 310, establishes a discharging/charging plan for the battery cell pack once the optimized SOC range is known. The discharging/charging plan determines the SOC starting point and the SOC ending point for the life-cycle optimized SOC determined in step 310. Because reduction in life-cycle impact of charging may actually have an SOC starting point lower than the current SOC, in appropriate instances the discharging/charging plan includes one or more discharging stages in addition to one or more charging stages. In some implementations, there may not be any discharging stages.

Step 320 applies the discharging/charging plan established in step 315 to the battery cell pack. The number and type of discharging/charging profiles used are modeled in step 315 so step 320 may implement conventional charging, fast-charging, or other charging profiles as specified by the discharging/charging plan.

In a simple implementation, the user receives information regarding actual driving behavior from log 155 via interface 145. The user operates interface 145 to create the desired operational profile which identifies the number of miles that the vehicle is expected to be used on a given day in advance of the actual charging for that day. The operational profile could be a daily, weekly, monthly or other periodic schedule as noted above and as determined by a user (or automatically determined based upon driving history—and in some cases the user reviewing/screening the automatic results to account for anticipated variances from historical use and to adjust the operational parameter as desired.)

Once the operational profile is available, BMS 115 (which controls charging and discharging equipment) determines a base level SOC that meets the operational parameter while minimizing the life-cycle impact of charging the battery cell pack to the base level SOC. A discharging/charging plan is established to provide the base level SOC optimized for the life-cycle concerns. (For example, a 100 mile range may match a 75% to 25% SOC range.) When the desired range parameter indicates an increased desired range, the SOC range increases as well. (For example, it may become a 80% to 25% SOC range for 110 mile range requirement.)

In many cases, the applied SOC may differ from the determined base level SOC. As FIG. 2 indicates, in some embodiments it is desirable to add a margin to the base level SOC. As the example of FIG. 2 illustrates, one cause of the margin is to account for real-world variations in driving range as determined from historical data. This margin, like the operational parameter, may be determined on periods matching the determined operational parameters. For weekly operational parameters, the margin reflects these periods. In other cases, the margin may be used to compensate for a battery cell pack age. As the battery cells age, capacity declines. Practically, this means that a wider SOC range is desired to meet the same vehicle range targets as was met by a narrower SOC range when the battery cells were newer. Electric vehicles have other variable power needs besides providing the primary mission of mileage. User needs/desires for temperature and humidity control are preferably factored in and added as appropriate margin to the base level SOC range. Temperature and humidity control are specific examples of auxiliary uses for the charge stored within the battery cell pack. Other auxiliary uses may include battery cell pack cooling and heating and other environmental factors controlled by the user (e.g., internal/external lights, audio systems, and other charge using loads in the vehicle.) A user's actual or historic use informs the establishment of the margin and the actual SOC range.

Once the actual SOC is established, the discharging/discharging plan is created to provide sufficient charge while reducing the impact of the charging cycle on the life cycle. The plan includes the desired starting and ending SOC points. Various discharging/charging stages are used to meet the actual SOC range.

In other implementations, a user may provide a range window rather than a particular single target. Example, the user may provide system with a low-high range of 100-120 mile range. The energy/SOC window determination may vary based upon one or more additional factors, including age (as the battery ages and capacity fades, a wider SOC window is required to accomplish the same range target), temperature & humidity—auxiliary loads (for example, battery pack cooling and heating)—the margin would be wider for extremely cold and hot climates (previous temperature history over a month or so would help determine this). Additionally, could also track average auxiliary loads over a period).

In some embodiments, the system and method queries the user for how many miles usually driven (to calculate optimal SOC range required). Based on what the driver actually drives, a certain weighting factor is established between the actual and the desired. The system determines additional weighting between what is requested and what is automatically calculated by the system. For example, when the system calculates that the user needs 60 miles of driving range, and the user enters 200 miles as a target range because of an anticipated trip, to determine how much extra SOC or energy is required, the system takes into account the past vehicle efficiency (Wh/mi) to determine how much more energy would be required to meet the 200 mile target and then charges to the appropriate SOC level.

U.S. Pat. No. 7,629,773 issued 8 Dec. 2009, hereby expressly incorporated by reference in its entirety for all purposes, describes a method and apparatus that allows an end user to optimize a performance of an all-electric or hybrid vehicle and its charging system for a desired mode of operation. The system of that invention includes multiple charging/ operational modes from which the user may select. Each charging/operational mode controls the cut-off voltage used during charging and the maintenance temperature of the battery pack, those modes including a standard mode, a storage mode, an extended driving range mode, and a performance mode. A novel and non-obvious improvement over that invention includes use of a preset range mode in addition to one or more of the disclosed modes. This preset range mode would include a model where a user sets/selects a number for desired range with the system determining an energy profile for the selected mode (and may include a reserve margin as described herein), or the system determines for the user, a particular specific range. Embodiments of the present invention may also be used with one or more of the implemented modes.

The system above has been described in the preferred embodiment of an embedded automobile (EV) electric charging system. The system, method, and computer program product described in this application may, of course, be embodied in hardware; e.g., within or coupled to a Central Processing Unit ("CPU"), microprocessor, microcontroller, System on Chip, or any other programmable device. Additionally, the system, method, and computer program product, may be embodied in software (e.g., computer readable code, program code, instructions and/or data disposed in any form, such as source, object or machine language) disposed, for example, in a computer usable (e.g., readable) medium configured to store the software. Such software enables the function, fabrication, modeling, simulation, description and/or testing of the apparatus and processes described herein. For example, this can be accomplished through the use of general programming languages (e.g., C, C++), GDSII databases, hardware description languages (HDL) including Verilog HDL, VHDL, AHDL (Altera HDL) and so on, or other available programs, databases, nanoprocessing, and/or circuit (i.e., schematic) capture tools. Such software can be disposed in any known computer usable medium including semiconductor (Flash, or EEPROM, ROM), magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets. A system, method, computer program product, and propagated signal embodied in software may be included in a semiconductor intellectual property core (e.g., embodied in HDL) and transformed to hardware in the production of integrated circuits. Additionally, a system, method, computer program product, and propagated signal as described herein may be embodied as a combination of hardware and software.

One of the preferred implementations of the present invention is as a routine in an operating system made up of programming steps or instructions resident in a memory of a computing system as well known, during computer operations. Until required by the computer system, the program instructions may be stored in another readable medium, e.g. in a disk drive, or in a removable memory, such as an optical disk for use in a CD ROM computer input or other portable memory system for use in transferring the programming steps into an embedded memory used in the charger. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media in a variety of forms.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, and the like. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A state-of-charge control system, comprising:
    a rechargeable energy storage system configured to provide propulsion energy for an electric vehicle;
    a charger, coupled to said rechargeable energy storage system, providing a charging current for said rechargeable energy storage system;
    a discharger coupled to said rechargeable energy storage system
    a battery management system coupled to said rechargeable energy storage system, to said charger and to said discharger, said battery management system configured to control said charging current responsive to an adjustable charge profile; a battery data acquisition and monitoring subsystem; and a communication bus coupled to said rechargeable energy storage system and to said battery data acquisition and monitoring subsystem; wherein said battery data acquisition and monitoring subsystem provides a plurality of attributes of said rechargeable energy storage system to said battery management system, at least one attribute including a state-of-charge of said rechargeable energy storage system; wherein said adjustable charge profile is configured from a range required target, a vehicle efficiency, and an optimal state-of-charge range to achieve said range required target responsive to said vehicle efficiency; and wherein said adjustable charge profile is further configured to optimize a cycle life of the rechargeable energy storage system given said optimal state-of charge.

2. The state-of-charge control system of claim 1, further comprising a user interface, coupled to said battery management system and wherein said user interface is configured to provide said range required target.

3. The state-of-charge control system of claim 2 further comprising a memory, coupled to said user interface, storing a log including operation/performance data including a plurality of historic ranges and a plurality of historic vehicle efficiencies wherein said vehicle efficiency includes a statistical calculation responsive to said plurality of historic vehicle efficiencies.

4. A state-of-charge control method, comprising:
    a) providing a charging current for a rechargeable energy storage system configured to provide propulsion energy for an electric vehicle;
    b) acquiring a plurality of attributes from said rechargeable energy storage system, at least one attribute including a state-of-charge of said rechargeable energy storage system;
    c) configuring said adjustable charge profile from a range required target, a vehicle efficiency, and an optimal state-of-charge range to achieve said range required target responsive to said vehicle efficiency;
    d) configuring said adjustable charge profile to optimize a cycle life for the rechargeable energy storage system given said optimal state-of charge; and
    e) controlling said charging current responsive to an adjustable charge profile.

5. The state-of charge control system of claim 2 further comprising a memory, coupled to said user interface, storing a log including performance data including a plurality of historic ranges and a plurality of historic vehicle efficiencies wherein said vehicle efficiency includes a statistical calculation responsive to said plurality of historic vehicle efficiencies.

* * * * *